United States Patent
Takasuga

(10) Patent No.: US 11,840,293 B2
(45) Date of Patent: Dec. 12, 2023

(54) TURNING SYSTEM FOR VEHICLE

(71) Applicant: TOYOTA JIDOSHA KABUSHIKI KAISHA, Toyota (JP)

(72) Inventor: Kazuki Takasuga, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 17/573,064

(22) Filed: Jan. 11, 2022

(65) Prior Publication Data
US 2022/0227415 A1 Jul. 21, 2022

(30) Foreign Application Priority Data
Jan. 15, 2021 (JP) .................................. 2021-004701

(51) Int. Cl.
*B62D 6/00* (2006.01)
*B62D 5/04* (2006.01)

(52) U.S. Cl.
CPC .............. *B62D 6/00* (2013.01); *B62D 5/046* (2013.01); *B62D 5/0418* (2013.01)

(58) Field of Classification Search
CPC .......... B62D 6/00; B62D 6/06; B62D 5/0418; B62D 5/046
See application file for complete search history.

(56) References Cited

U.S. PATENT DOCUMENTS

| | | | |
|---|---|---|---|
| 11,453,387 B1* | 9/2022 | Huennekens | B60W 10/04 |
| 2001/0054801 A1* | 12/2001 | Perello | B62D 5/0418 |
| | | | 280/5.52 |
| 2004/0140642 A1* | 7/2004 | Perello | B62D 5/0418 |
| | | | 280/124.147 |
| 2005/0216162 A1 | 9/2005 | Suzuki et al. | |
| 2010/0222959 A1* | 9/2010 | Murata | B60W 10/22 |
| | | | 701/31.4 |
| 2020/0156700 A1* | 5/2020 | Shiraishi | B62D 5/0463 |
| 2022/0065753 A1* | 3/2022 | Kamikura | G01M 17/022 |
| 2022/0348254 A1* | 11/2022 | Starik | B62D 7/16 |
| 2023/0234637 A1* | 7/2023 | Miyakawa | B62D 6/00 |
| | | | 180/402 |

FOREIGN PATENT DOCUMENTS

| | | |
|---|---|---|
| JP | 2001-37300 A | 2/2001 |
| JP | 2005-255112 A | 9/2005 |
| JP | 2010-234935 A | 10/2010 |
| JP | 2010-234937 A | 10/2010 |
| JP | 2014-915 A | 1/2014 |

\* cited by examiner

*Primary Examiner* — Phutthiwat Wongwian
*Assistant Examiner* — Anthony L Bacon
(74) *Attorney, Agent, or Firm* — Sughrue Mion, PLLC

(57) ABSTRACT

In a turning system for a vehicle, a toe angle change is acquired based on an estimated stroke which is a stroke of a suspension which is estimated based on a moving state of a vehicle and an actual stroke which is an actual stroke of the suspension detected by a stroke sensor, and control of a turning angle of a vehicle wheel is performed based on the acquired toe angle change. Accordingly, it is possible to appropriately perform control of a turning angle even in travel.

4 Claims, 6 Drawing Sheets

$\delta ref = \delta refs + \Delta T$

TURNING SYSTEM FOR VEHICLE

CROSS-REFERENCE TO RELATED APPLICATION

This application claims priority to Japanese Patent Application No. 2021-004701 filed on Jan. 15, 2021, incorporated herein by reference in its entirety.

BACKGROUND

1. Technical Field

The present disclosure relates to a turning system for a vehicle that turns vehicle wheels which are provided on the vehicle.

2. Description of Related Art

Japanese Unexamined Patent Application Publication No. 2010-234937 (JP 2010-234937 A) discloses a turning system for a vehicle with which automatic parking control for causing a vehicle to travel automatically to a parking position is performed. In the turning system for a vehicle described in JP 2010-234937 A, a toe angle change is acquired based on a difference between a prescribed stroke which is a stroke of a suspension in a constant load (which corresponds to a standard stroke which is a stroke of the suspension when a load applied to vehicle wheels is a standard load in a stopped state of the vehicle) and an actual stroke which is an actual stroke of the suspension detected by a stroke sensor, and a turning angle of the vehicle wheels is controlled based on the acquired toe angle change.

SUMMARY

The present disclosure provides a turning system for a vehicle that can allow a turning angle of vehicle wheels to be appropriately controlled.

In a turning system for a vehicle according to the present disclosure, a toe angle change is acquired based on an estimated stroke which is a stroke of a suspension which is estimated based on a moving state of a vehicle and an actual stroke which is an actual stroke of the suspension detected by a stroke sensor, and control of a turning angle of a vehicle wheel is performed based on the acquired toe angle change. Accordingly, it is possible to appropriately perform control of a turning angle even in travel.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
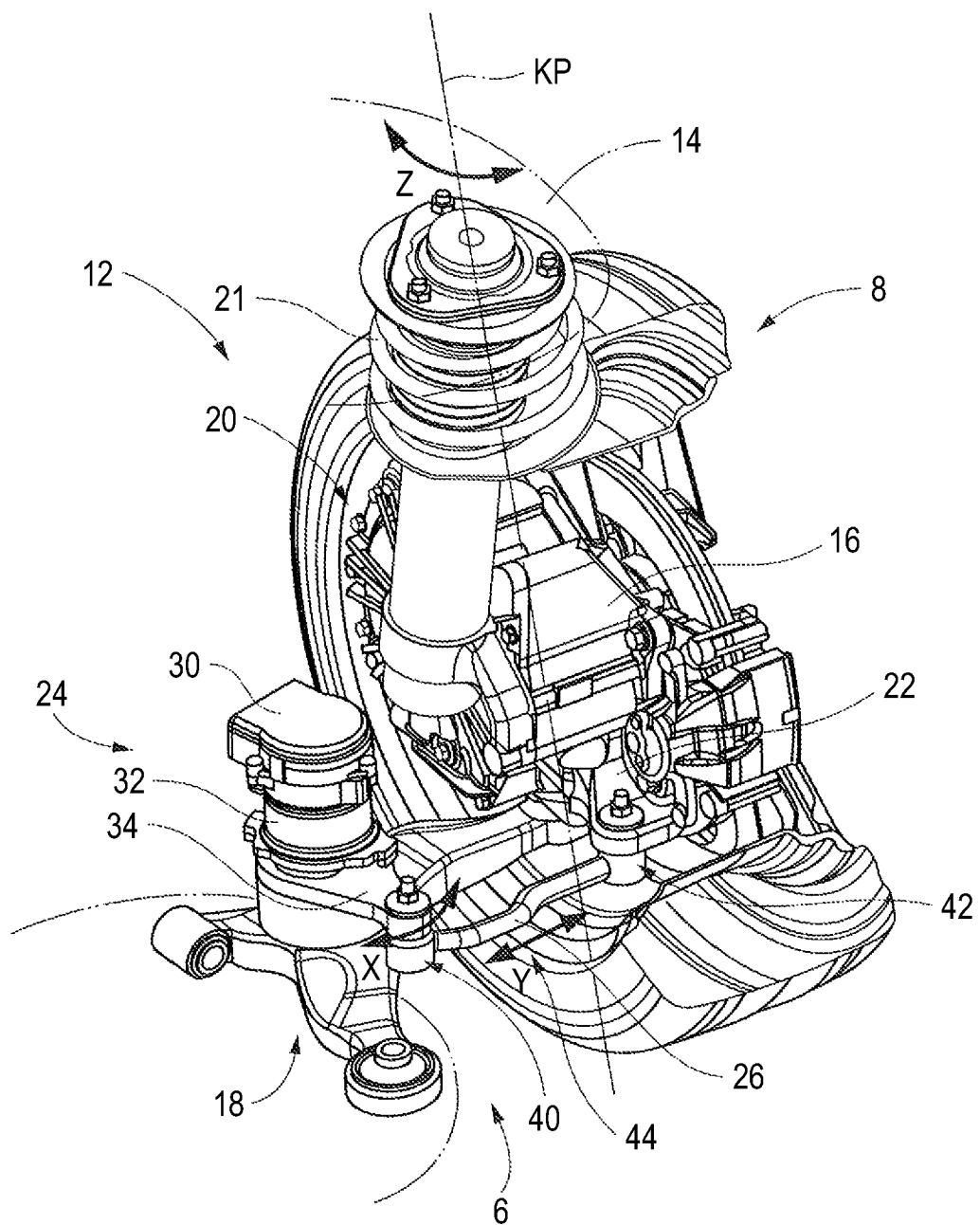
FIG. 1 is a perspective view illustrating a turning device which is included in a turning system for a vehicle according to an embodiment of the present disclosure and peripheries thereof.

Hereinafter, a turning system for a vehicle according to an embodiment of the present disclosure will be described with reference to the accompanying drawings. The turning system for a vehicle is of a steer-by-wire type and includes a turning device 6 that is provided in each of a plurality of turning wheels (a front-right wheel which is one of the plurality of turning wheels is illustrated in FIG. 1) 8 of a vehicle and a turning electronic control unit (ECU) 10 which is a control device for controlling turning angles of the plurality of turning wheels 8 by controlling the plurality of turning devices 6. Each of the plurality of turning wheels 8 is supported by a vehicle body (a body-side member) 14 via a suspension 12.

First Embodiment

As illustrated in FIG. 1, the turning devices 6 independently turn the plurality of turning wheels (right and left front wheels are turning wheels in this embodiment) 8. Since the turning devices 6 have the same structure, the turning device 6 provided in the front-right wheel 8 will be described in this embodiment and description of the turning device provided in the front-left wheel will be omitted.

The front-right wheel (hereinafter also referred to as a vehicle wheel) 8 is rotatably held by a steering knuckle (hereinafter referred to as a knuckle) 16. A lower arm 18 is connected to the knuckle 16, and the lower arm 18 is connected to a body-side member 14 (not illustrated) with a bush interposed therebetween such that it can swing in a vertical direction (around an axis extending in a longitudinal direction) and a horizontal direction (around an axis extending in the vertical direction). The knuckle 16 is supported by the body-side member 14 via a shock absorber 20 and a suspension spring 21.

In this embodiment, the lower arm 18, the shock absorber 20, the suspension spring 21, and the like constitute a suspension 12. The suspension 12 is of a strut type as illustrated in FIG. 1.

The turning device 6 includes the knuckle 16, a turning actuator 24 that is provided in the lower arm 18, a pitman arm 34 that is connected to an output shaft (not illustrated) of the turning actuator 24, and a tie rod 26 which is a connection member that connects the pitman arm 34 and a knuckle arm 22 of the knuckle 16.

The turning actuator 24 includes a turning motor 30 that is an electric motor which is a drive source and a reduction gear 32 that decreases rotation of the turning motor 30. The reduction gear 32 includes a planetary gear mechanism including a plurality of pairs of gears and serves to decrease rotation of the turning motor 30 and to output the decreased rotation to an output shaft. One end of the pitman arm 34 is integrally rotatably connected to the output shaft and the other end is connected to the tie rod 26 via a connection portion 40. One end of the tie rod 26 is connected to the pitman arm 34 as described above and the other end is connected to the knuckle arm 22 via a connection portion 42.

In the turning device 6, when the pitman arm 34 rotates around an axis of the turning actuator 24 with driving of the turning actuator 24 in a direction indicated by an arrow X in FIG. 1, the tie rod 26 moves therewith in a direction indicated by an arrow Y, and thus the knuckle arm 22 and the knuckle 16 rotate around a kingpin axis KP and the vehicle wheel 8 is turned in a direction indicated by an arrow Z.

Figure 9:
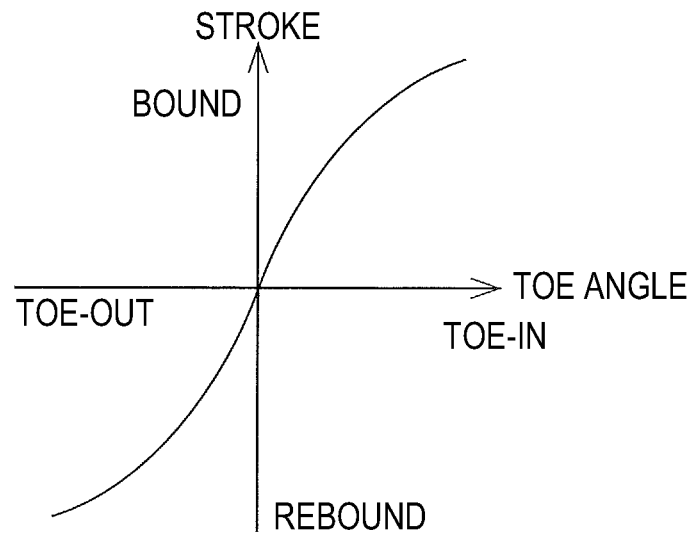
FIG. 9 is a diagram illustrating a relationship between a stroke and a toe angle in a suspension of a vehicle in which the turning system for a vehicle is provided, the relationship between a stroke and a toe angle being formed in a map and being stored in the storage unit of the turning ECU.

On the other hand, a relationship between a stroke and a toe angle which is illustrated in FIG. 9 is satisfied in the suspension 12. When a stroke of the suspension 12 (a distance between the body-side member 14 and the vehicle wheel 8) is small (is displaced to a bound side), the front-right wheel 8 is tilted to a toe-in side. When the stroke of the suspension 12 is large (is displaced to a rebound side), the front-right wheel 8 is tilted to a toe-out side. In this way, the stroke and the toe angle in the suspension 12 correspond one to one.

In this embodiment, the relationship between the stroke and the toe angle illustrated in FIG. 9 is, for example, a relationship which is acquired by a tester before shipment of the vehicle, and is formed as a map and stored in a storage unit of the turning ECU 10 in advance.

Figure 2:
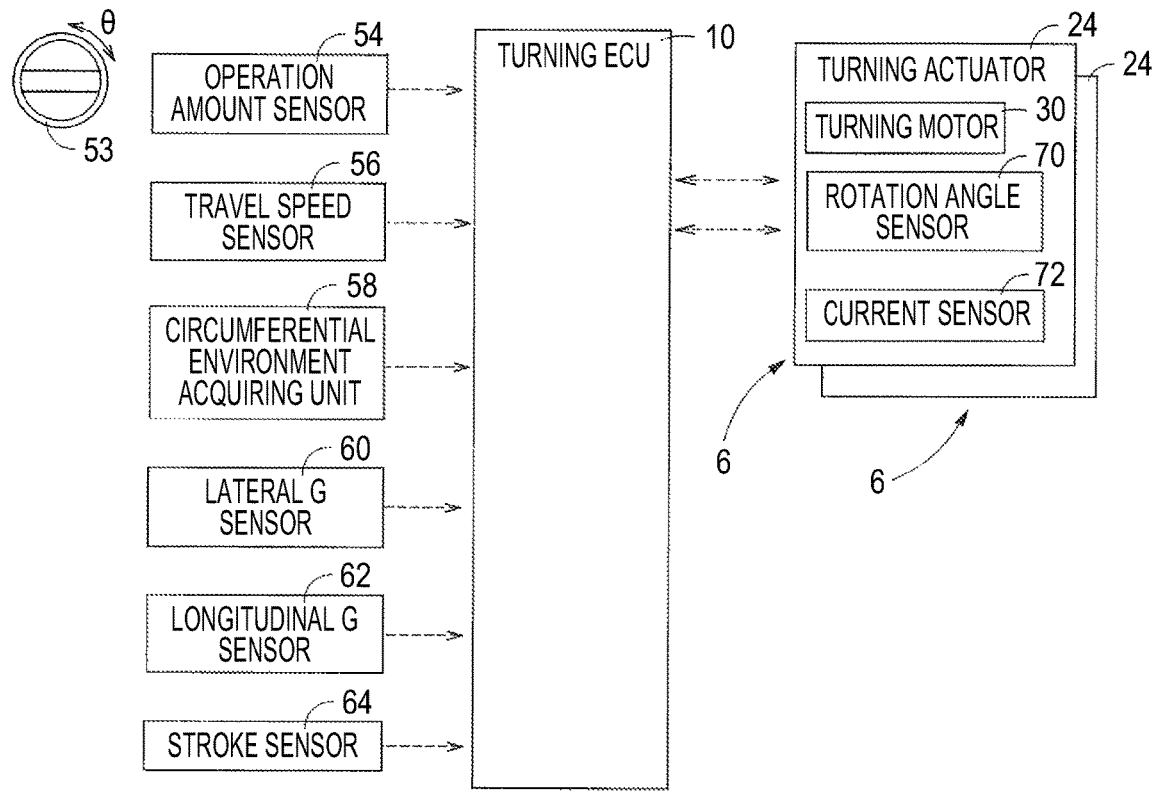
FIG. 2 is a block diagram conceptually illustrating peripherals of a turning ECU which is included in the turning system for a vehicle.

As illustrated in FIG. 2, the turning ECU 10 includes a computer as a major component and includes an execution unit, a storage unit, and an input and output unit which are not illustrated. An operation amount sensor 54 that detects an amount of operation $\theta$ of a steering operation member (for example, a steering wheel) 53 which can be operated by a driver, a travel speed sensor 56 that detects a travel speed of the vehicle, a peripheral environment acquiring unit 58 that acquires a peripheral environment of the vehicle, a lateral G sensor 60 that detects a lateral G (Gy) which is a lateral acceleration acting on the vehicle, a longitudinal G sensor 62 that detects a longitudinal G (Gx) which is a longitudinal acceleration acting on the vehicle, a stroke sensor 64 that detects a stroke of the suspension 12, and the like are connected to the input and output unit, and the turning devices 6 which are provided in the right and left front wheels 8 are connected thereto.

The peripheral environment acquiring unit 58 includes a camera and a radar device and serves to recognize an object or a marking line near the vehicle which is a vehicle in which the turning system for a vehicle is mounted and to acquire a relative positional relationship between the object or the marking line and the vehicle.

The stroke sensor 64 is configured to detect a change of a length in the vertical direction between the body-side member 14 and the vehicle wheel 8 and is also referred to as a vehicle height sensor. The stroke sensor 64 detects an expansion/contraction length on a bound side and an expansion/contraction length on a rebound side of the suspension 12 from a standard vehicle height which is a vehicle height when a load applied to the vehicle wheel 8 is a standard load with the stroke of the suspension 12 at the standard vehicle height set to 0.

A rotation angle sensor 70 that detects a rotation angle from a neutral position of the turning motor 30 of the turning actuator 24, a current sensor 72 that detects a current flowing in the turning motor 30, and the like are provided in the turning device 6. The turning ECU 10 acquires an actual turning angle $\delta^*$ which is an actual turning angle from a neutral position of the vehicle wheel 8 based on a detection value from the rotation angle sensor 70. A control command value for the electric motor 30 (for example, corresponding to a supply current value which is a current value to be supplied) is supplied from the turning ECU 10 to the turning device 6.

Figure 3:
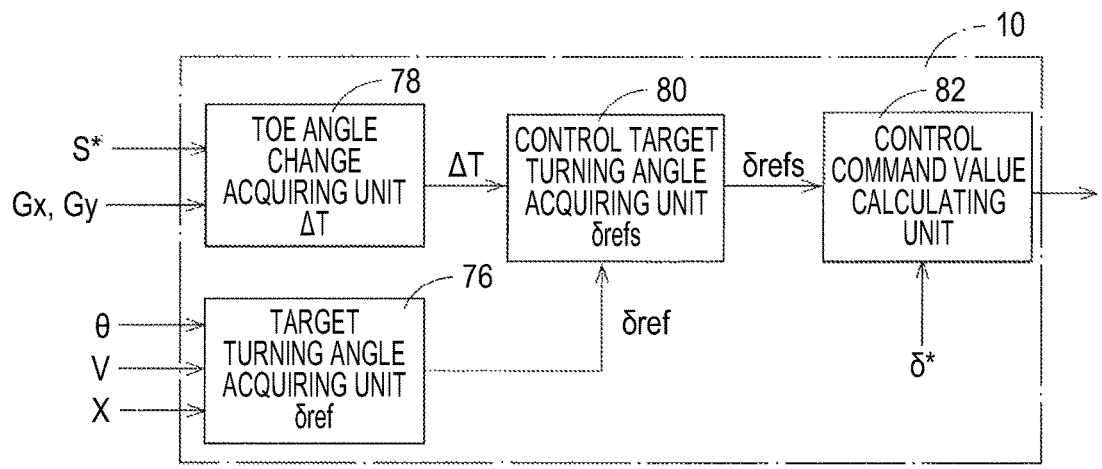
FIG. 3 is a block diagram conceptually illustrating a structure of the turning ECU.

The turning ECU 10 includes a target turning angle acquiring unit 76, a toe angle change acquiring unit 78, a control target turning angle acquiring unit 80, and a control command value calculating unit 82 as illustrated in FIG. 3.

The target turning angle acquiring unit 76 acquires a target turning angle $\delta$ref of each vehicle wheel 8, and acquires the target turning angle $\delta$ref based on the amount of operation $\theta$ of the steering operation member 53 detected by the operation amount sensor 54, the travel speed V of the vehicle detected by the travel speed sensor 56, a value X indicating the relative positional relationship between the vehicle and an object or a marking line acquired by the peripheral environment acquiring unit 58, and the like. For example, the target turning angle $\delta$ref may be set to an angle which is larger when the amount of operation $\theta$ is large than when the amount of operation $\theta$ is small and which is smaller when the travel speed V is high than when the travel speed V is low. Based on the value X indicating the relative positional relationship between the vehicle and the object or the marking line, the target turning angle $\delta$ref may be determined such that the vehicle avoids the object, determined such that the vehicle does not depart from the marking line, determined such that the vehicle travels along a target travel line, or the like.

The toe angle change acquiring unit 78 acquires a toe angle change $\Delta T$ based on an estimated stroke Sest which is a stroke of the suspension 12 estimated based on a moving state of the vehicle and an actual stroke S* which is an actual stroke of the suspension 12 detected by the stroke sensor 64.

Figure 4:
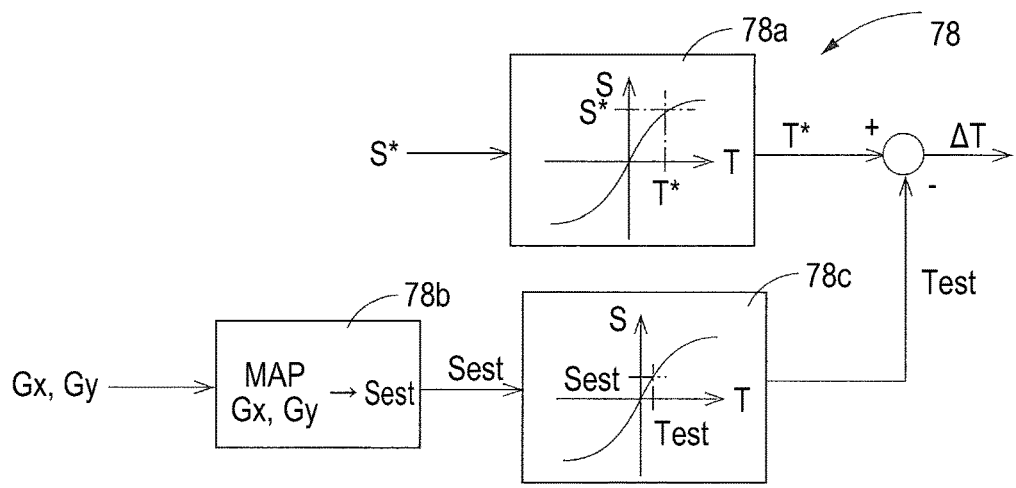
FIG. 4 is a block diagram illustrating operations which are performed by a toe angle change acquiring unit of the turning ECU.

The toe angle change acquiring unit 78 includes an actual toe angle acquiring unit 78a, an estimated stroke acquiring unit 78b, and an estimated toe angle acquiring unit 78c as illustrated in FIG. 4. The actual toe angle acquiring unit 78a acquires an actual toe angle T* based on the actual stroke S* and the map illustrated in FIG. 9. On the other hand, the estimated stroke acquiring unit 78b acquires a roll state and a pitch state (which are examples of the moving state) of the vehicle based on the lateral G (Gy) and the longitudinal G (Gx) detected by the lateral G sensor 60 and the longitudinal G sensor 62, acquires slopes in the lateral direction and the longitudinal direction of the body-side member 14, and acquires the estimated stroke Sest which is the stroke of the suspension 12 corresponding to each of the right and left front wheels 8 based on the slopes. The estimated toe angle acquiring unit 78c acquires the estimated toe angle Test based on the estimated stroke Sest and the map illustrated in FIG. 9. A difference between the actual toe angle T* and the estimated toe angle Test is acquired as the toe angle change $\Delta T$.

Figure 10:
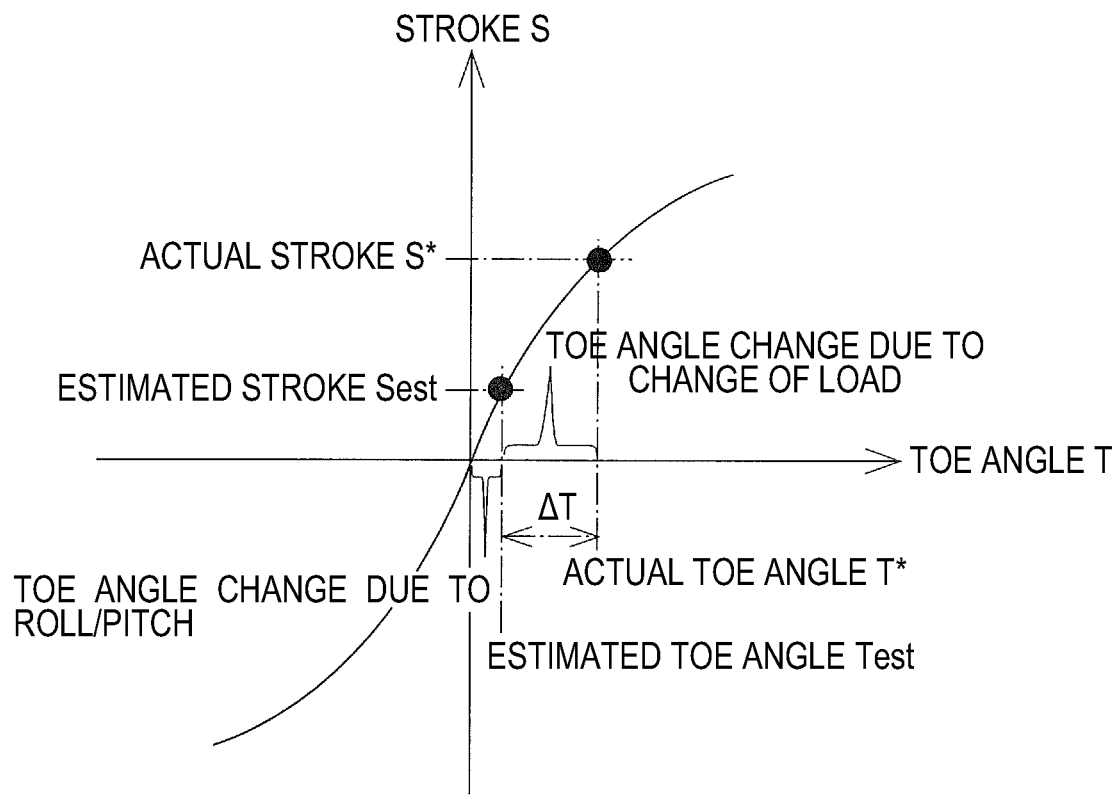
FIG. 10 is a diagram illustrating a toe angle change which is acquired by the turning ECU.

As illustrated in FIG. 10, the toe angle change ΔT corresponds to the stroke of the suspension 12 which is generated due to a change of the load applied to the vehicle wheel 8 in a stopped state from the standard load. When the load applied to the vehicle wheel 8 is the standard load and the stroke of the suspension 12 is 0 (when the suspension 12 strokes neither to the bound side nor to the rebound side), the toe angle is 0. When the load applied to the vehicle wheel 8 is larger than the standard load, the suspension 12 strokes to the bound side and the vehicle wheel 8 is tilted to the toe-in side. On the other hand, when acceleration or the like is applied to the vehicle, the body-side member 14 is tilted, the load applied to the vehicle wheel 8 changes, and the suspension 12 strokes. The estimated toe angle Sest is a toe angle based on the estimated stroke Sest which is estimated based on the acceleration applied to the vehicle. On the other hand, the actual stroke S* includes the estimated stroke Sest and the stroke of the suspension 12 due to a change of the load applied to the vehicle wheel 8 in the stopped state from the standard load. Accordingly, in a state in which acceleration or the like is applied to the vehicle, it is possible to acquire the toe angle change ΔT corresponding to the change of the load applied to the vehicle wheel 8 in the stopped state from the standard load by subtracting the estimated toe angle Test from the actual toe angle T* corresponding the actual stroke S*.

In the turning system for a vehicle described in JP 2010-234937 A, the toe angle change is acquired based on the difference between the actual stroke and the standard stroke. In automatic parking control, since the vehicle travels at a very low speed, the difference between the actual stroke and the standard stroke becomes a magnitude corresponding to the change of the load applied to the vehicle wheel in the stopped state from the standard load. In other words, when the vehicle is traveling at a very low speed, it is possible to acquire a toe angle change corresponding to the change of the load applied to the vehicle wheel from the standard load based on the difference between the actual stroke and the standard stroke.

On the other hand, when the vehicle is traveling, a longitudinal acceleration (which includes deceleration) is applied to the vehicle or a lateral acceleration is applied to the vehicle (the vehicle turns). Accordingly, even when the actual stroke and the standard stroke are compared, it is difficult to acquire the toe angle change ΔT corresponding to the change of the load applied to the vehicle wheel 8 in the stopped state from the standard load.

Therefore, in this embodiment, the stroke of the suspension 12 is estimated based on the moving state of the vehicle, for example, the lateral or longitudinal acceleration (Gy, Gx) applied to the vehicle, and the toe angle change ΔT is acquired based on the estimated stroke Sest and the actual stroke S*. As a result, even in a state in which acceleration or the like is applied to the vehicle, it is possible to acquire the toe angle change ΔT corresponding to the change of the load applied to the vehicle wheel 8 in the stopped state from the standard load.

Figure 5:
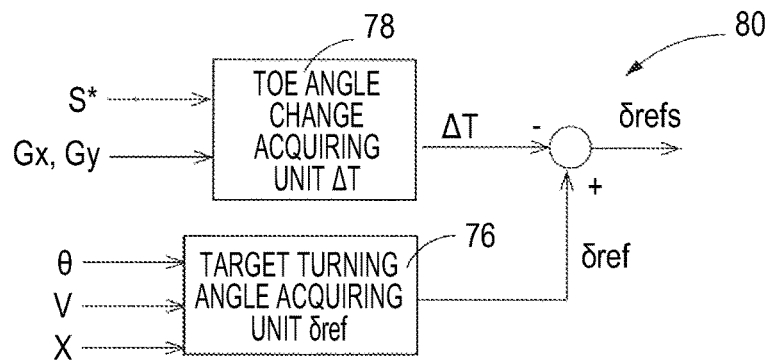
FIG. 5 is a block diagram illustrating operations which are performed by a control target turning angle acquiring unit of the turning ECU.

The control target turning angle acquiring unit 80 is configured to acquire a corrected value obtained by correcting the target turning angle δref using the toe angle change ΔT, and the corrected value is referred to as a control target turning angle δrefs which is used for control of the turning angle. As illustrated in FIG. 5, the control target turning angle acquiring unit 80 acquires the control target turning angle δrefs, for example, by subtracting the toe angle change ΔT acquired by the toe angle change acquiring unit 78 from the target turning angle δref acquired by the target turning angle acquiring unit 76.

Figure 11:
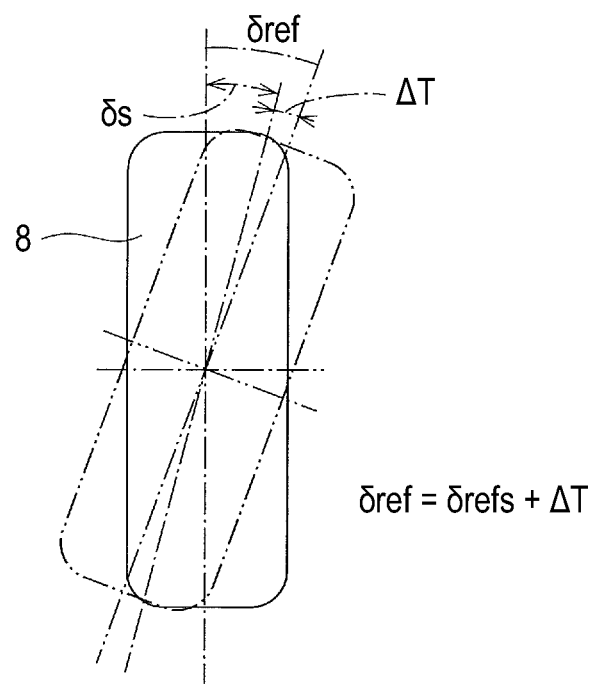
FIG. 11 is a diagram conceptually illustrating a vehicle wheel which is steered by the turning system for a vehicle.

When the vehicle wheel 8 is turned to the target turning angle δref as illustrated in FIG. 11, the toe angle change ΔT is a turning angle of the vehicle wheel 8 which is generated regardless of control. Accordingly, by turning the vehicle wheel 8 by the control target turning angle δrefs which is an angle obtained by subtracting the toe angle change ΔT from the target turning angle δref through the control, the vehicle wheel 8 is eventually turned by the target turning angle δref. Since the target turning angle δref is a vector having a direction, the control target turning angle δrefs is calculated in consideration of the direction of the target turning angle δref.

In this way, the position to which the vehicle wheel 8 is turned by the toe angle change ΔT is a center position of the vehicle wheel 8 in control of the turning angle, and the vehicle wheel 8 is turned with the position turned by the toe angle change ΔT as a midpoint. Accordingly, correction of the target turning angle δref can be considered to be an offset of the midpoint in control of the turning angle of the vehicle wheel 8.

The control command value calculating unit 82 acquires an actual turning angle δ* which is an actual turning angle of the vehicle wheel 8 based on the detection value from the rotation angle sensor 70, and calculates the control command value such as a current supplied to the electric motor 30, which is required for the actual turning angle δ* to approach the control target turning angle δrefs. The calculated control command value is output to the turning device 6.

Figure 6:
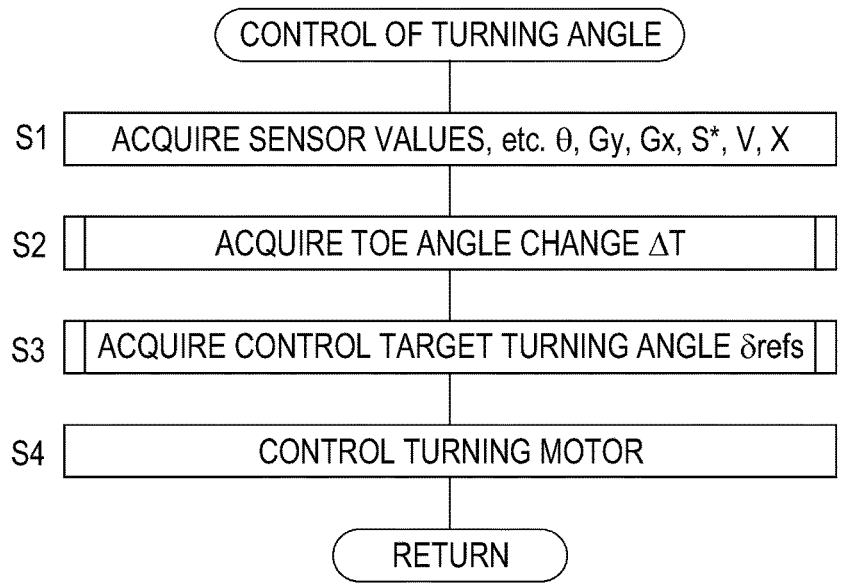
FIG. 6 is a flowchart conceptually illustrating a turning control program which is stored in a storage unit of the turning ECU.

In the turning ECU 10, a turning angle control program illustrated in the flowchart of FIG. 6 is repeatedly executed at intervals of a predetermined set time (a cycle time). The turning angle control program is executed for the turning device 6 of each of the right and left front wheels 8. In Step 1 (hereinafter simply abbreviated to S1, which also applies to other steps), the amount of operation θ, the lateral G (Gy), the longitudinal G (Gx), the actual stroke S*, the travel speed V, the value X indicating the relative positional relationship between the vehicle and an object or a marking line, and the like are acquired. The toe angle change ΔT is acquired in S2, the control target turning angle δrefs is acquired in S3, and control of the turning angle based on the control target turning angle δrefs is performed in S4.

Figure 7:
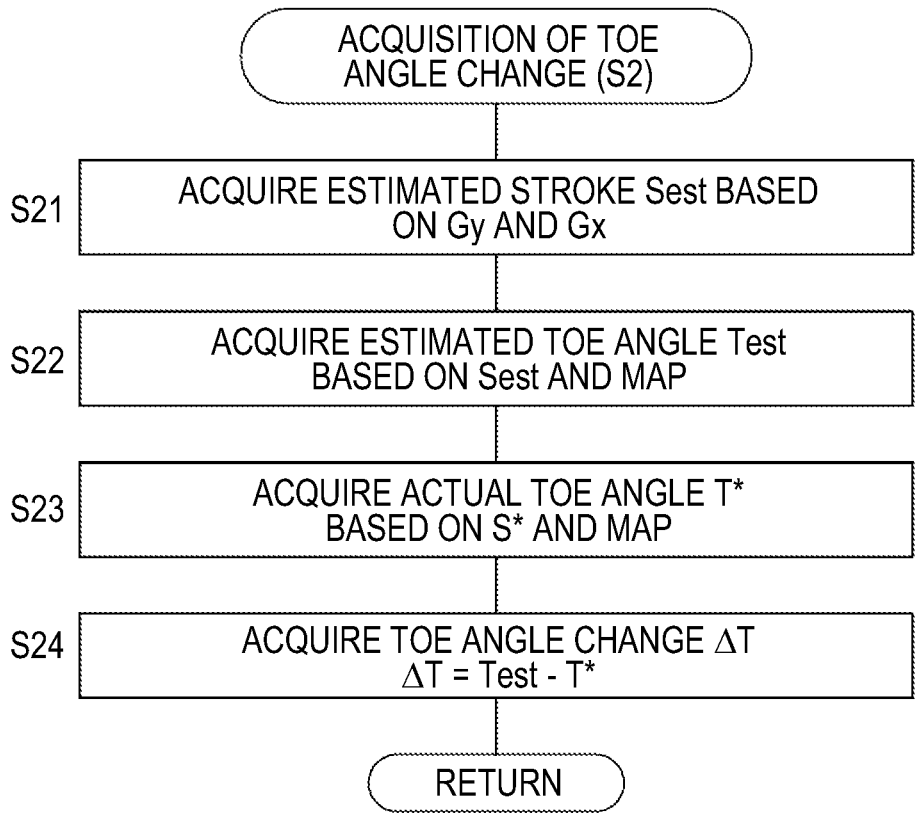
FIG. 7 is a flowchart conceptually illustrating a part (S2) of the turning control program.

S2 of acquiring the toe angle change will be described below with reference to the routine illustrated in FIG. 7. In S21, a stroke Sest for a front wheel 8 is estimated based on Gy, Gx, and the like. In S22, an estimated toe angle Test for the vehicle wheel (a control target wheel) is acquired based on the estimated stroke and the map. An actual toe angle T* is acquired based on the actual stroke S* and the map in S23, and a toe angle change ΔT which is a difference between the actual toe angle T* and the estimated toe angle Test is acquired in S24.

Figure 8:
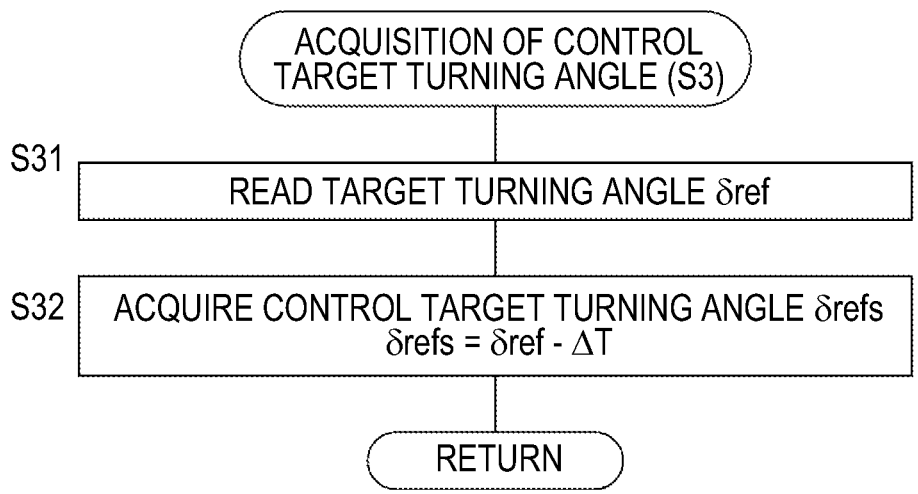
FIG. 8 is a flowchart conceptually illustrating another part (S3) of the turning control program.

S3 of acquiring the control target turning angle will be described below with reference to the routine illustrated in FIG. 8. In S31, the target turning angle δref acquired by the target turning angle acquiring unit 76 is read. In S32, a control target turning angle δrefs is acquired based on the target turning angle δref and the toe angle change ΔT.

In this way, in this embodiment, when the vehicle is traveling, the toe angle change ΔT due to the change of the load applied to the vehicle wheel 8 from the standard load is acquired based on the actual stroke S* and the estimated stroke Sest and control of the turning angle is performed in consideration of the toe angle change ΔT. As a result, the vehicle wheel 8 can be appropriately turned to the target turning angle δref and can be turned well.

Particularly, the turning system for a vehicle according to this embodiment can be effectively applied to a vehicle with a large change in load and a vehicle including a suspension with a large change in toe angle with respect to change of a stroke. Even when the vehicle body is tilted by the longitudinal G or the lateral G and the vehicle is traveling at a speed equal to or higher than a speed at which the stroke of the suspension 12 changes, it is possible to acquire the toe angle change corresponding to the change of the load from the standard load and to turn the vehicle wheel well. For example, when the vehicle is traveling at a high speed (for example, equal to or higher than 80 km/h), the vehicle body may be greatly tilted by the longitudinal G and the lateral G and the change in toe angle may increase. In this embodiment, even when the vehicle is traveling at a high speed, it is possible to acquire the toe angle change corresponding to the change of the load from the standard load and to turn the vehicle wheel well.

In the aforementioned embodiment, the target turning angle δref is corrected based on the toe angle change ΔT, but the actual turning angle δ* may be corrected and control of the turning angle may be performed such that a control actual turning angle which is the corrected actual turning angle δ* approaches the target turning angle δref.

Figure 12:
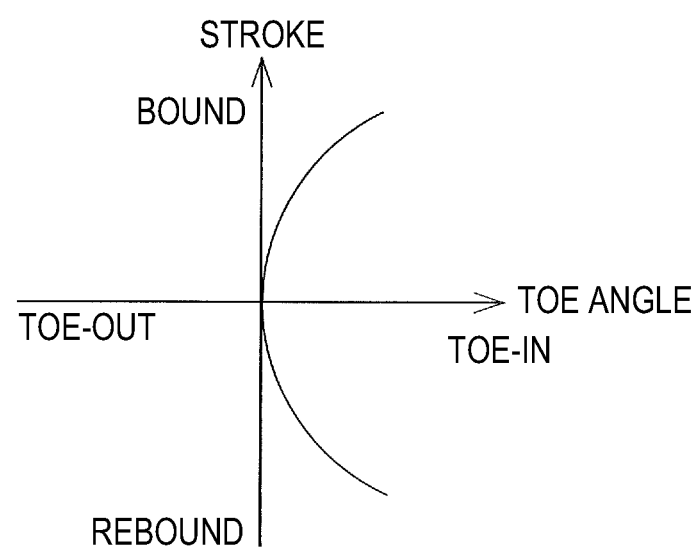
FIG. 12 is a diagram illustrating a relationship between a stroke and a toe angle in another suspension of a vehicle in which the turning system for a vehicle is provided.

The suspension may have a relationship between a stroke and a toe angle illustrated in FIG. 12. In this case, when the stroke decreases or increases, a toe angle on the toe-in side is generated in the vehicle wheel, and a situation in which one of the estimated stroke and the actual stroke has a value on the bound side and the other has a value on the rebound side rarely occurs. Accordingly, the present disclosure can be applied to a case in which the stroke and the toe angle correspond one to one in each of the bound side and the rebound side even if the stroke and the toe angle do not correspond one to one.

The suspension may be configured to have a relationship in which a toe angle on the toe-out side is generated when the stroke decreases or increases.

Regardless of what structure the turning device has, the present disclosure can be embodied in various forms subjected to various changes and improvements based on the knowledge of those skilled in the art.

(1) A turning system for a vehicle, including:
a turning device that turns a vehicle wheel which is held by a body-side member of the vehicle via a suspension; and
a control device configured to control a turning angle of the vehicle wheel by controlling the turning device,
wherein the control device includes a toe angle change acquiring unit configured to acquire a toe angle change which is an amount of change of a toe angle based on an estimated stroke which is a stroke of the suspension which is estimated based on a moving state of the vehicle and an actual stroke which is an actual stroke of the suspension, and
wherein the control device is configured to control the turning angle based on the toe angle change acquired by the toe angle change acquiring unit.

(2) The turning system for a vehicle according to (1), further including:
a stroke sensor that detects the actual stroke; and
a moving state detector that detects the moving state of the vehicle, wherein the toe angle change acquiring unit includes an estimated stroke acquiring unit configured to acquire the estimated stroke based on the moving state detected by the moving state detector.

(3) The turning system for a vehicle according to (2), wherein the toe angle change acquiring unit further includes:
an actual toe angle acquiring unit configured to acquire an actual toe angle which is a toe angle of the vehicle wheel based on the actual stroke detected by the stroke sensor; and
an estimated toe angle acquiring unit configured to acquire an estimated toe angle which is a toe angle of the vehicle wheel based on the estimated stroke acquired by the estimated stroke acquiring unit, and
wherein the toe angle change acquiring unit is configured to acquire the toe angle change based on a difference between the actual toe angle acquired by the actual toe angle acquiring unit and the estimated toe angle acquired by the estimated toe angle acquiring unit.

(4) The turning system for a vehicle according to (2) or (3), wherein the moving state detector is configured to detect at least one of a lateral acceleration and a longitudinal acceleration which are applied to the vehicle.

The moving state of the vehicle corresponds to a state in which a change in posture of the vehicle can be acquired. Examples of the moving state detector include a longitudinal acceleration sensor and a lateral acceleration sensor. Examples of the moving state detector further include a yaw rate sensor, a travel speed sensor, a roll rate sensor, and a pitch rate sensor. The moving state of the vehicle may be referred to as a traveling state of the vehicle.

(5) The turning system for a vehicle according to any one of (1) to (4), wherein the control device further includes:
a corrected value acquiring unit configured to acquire a corrected value by correcting at least one of an actual turning angle which is an actual turning angle of the vehicle wheel and a target turning angle which is determined for the vehicle wheel based on the toe angle change acquired by the toe angle change acquiring unit; and
a corrected value-based control unit configured to control the turning device based on the corrected value acquired by the corrected value acquiring unit.

The corrected value-based control unit may include a control command value calculating unit configured to calculate a control command value for the turning device.

(6) The turning system for a vehicle according to (5), wherein the control device further includes a target turning angle acquiring unit configured to acquire the target turning angle for the vehicle wheel,
wherein the corrected value acquiring unit includes a control target turning angle acquiring unit configured to acquire a control target turning angle which is a target turning angle used for control as the corrected value by correcting the target turning angle acquired by the target turning angle acquiring unit based on the toe angle change acquired by the toe angle change acquiring unit, and
wherein the corrected value-based control unit is configured to control the turning device such that the actual turning angle of the vehicle wheel approaches the control target turning angle acquired by the control target turning angle acquiring unit.

The target turning angle may be acquired, for example, based on at least one of an operation amount of a steering operation member which can be operated by a driver and a relative positional relationship between an object or a line marking near the vehicle in which the turning system for a vehicle is mounted and the vehicle.

(7) The turning system for a vehicle according to (5), further including a turning angle detector that detects the actual turning angle of the vehicle wheel, wherein the corrected value acquiring unit includes a control actual turning angle acquiring unit configured to acquire a control actual turning angle for the actual turning angle which is detected by the turning angle detector and which is used for control as the corrected value by correcting the actual turning angle based on the toe angle change acquired by the toe angle change acquiring unit, and wherein the corrected value-based control unit is configured to control the turning device such that the control actual turning angle acquired by the control actual turning angle acquiring unit approaches the target turning angle.

(8) The turning system for a vehicle according to any one of (1) to (7), wherein the turning device includes:

a turning actuator that includes an electric motor; and a connection member that connects an output shaft of the turning actuator to a knuckle arm of the vehicle wheel, and wherein the control device is configured to control the turning angle by controlling the electric motor.

What is claimed is:

1. A turning system for a vehicle, comprising:

a turning device that turns a vehicle wheel which is held by a body-side member of the vehicle via a suspension; and a control device configured to control a turning angle of the vehicle wheel by controlling the turning device, wherein the control device includes a toe angle change acquiring unit configured to acquire a toe angle change which is an amount of change of a toe angle based on an estimated stroke which is a stroke of the suspension which is estimated based on a moving state of the vehicle and an actual stroke which is an actual stroke of the suspension, and wherein the control device is configured to control the turning angle based on the toe angle change acquired by the toe angle change acquiring unit.

2. The turning system for a vehicle according to claim 1, further comprising:

a stroke sensor that detects the actual stroke; and a moving state detector that detects the moving state of the vehicle, wherein the toe angle change acquiring unit includes:

an estimated stroke acquiring unit configured to acquire the estimated stroke based on the moving state detected by the moving state detector;

an actual toe angle acquiring unit configured to acquire an actual toe angle which is a toe angle of the vehicle wheel based on the actual stroke detected by the stroke sensor; and an estimated toe angle acquiring unit configured to acquire an estimated toe angle which is a toe angle of the vehicle wheel based on the estimated stroke acquired by the estimated stroke acquiring unit, and wherein the toe angle change acquiring unit is configured to acquire the toe angle change based on a difference between the actual toe angle acquired by the actual toe angle acquiring unit and the estimated toe angle acquired by the estimated toe angle acquiring unit.

3. The turning system for a vehicle according to claim 1, wherein the control device further includes:

a corrected value acquiring unit configured to acquire a corrected value by correcting at least one of an actual turning angle which is an actual turning angle of the vehicle wheel and a target turning angle which is determined for the vehicle wheel based on the toe angle change acquired by the toe angle change acquiring unit; and a corrected value-based control unit configured to control the turning device based on the corrected value acquired by the corrected value acquiring unit.

4. The turning system for a vehicle according to claim 3, wherein the control device further includes a target turning angle acquiring unit configured to acquire the target turning angle for the vehicle wheel, wherein the corrected value acquiring unit includes a control target turning angle acquiring unit configured to acquire a control target turning angle which is a target turning angle used for control as the corrected value by correcting the target turning angle acquired by the target turning angle acquiring unit based on the toe angle change acquired by the toe angle change acquiring unit, and wherein the corrected value-based control unit is configured to control the turning device such that the actual turning angle of the vehicle wheel approaches the control target turning angle acquired by the control target turning angle acquiring unit.

* * * * *